(12) United States Patent
McClanahan et al.

(10) Patent No.: US 11,960,309 B2
(45) Date of Patent: *Apr. 16, 2024

(54) PORTABLE MASS AIRFLOW TRAINING MODULE

(71) Applicant: K&N Engineering, Inc., Riverside, CA (US)

(72) Inventors: Mac McClanahan, Riverside, CA (US); Steve Williams, Cherry Valley, CA (US); Joel Valles, Simi Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 17/494,181

(22) Filed: Oct. 5, 2021

(65) Prior Publication Data

US 2022/0026933 A1 Jan. 27, 2022

Related U.S. Application Data

(63) Continuation of application No. 16/867,787, filed on May 6, 2020, now Pat. No. 11,144,074, which is a continuation of application No. 15/454,891, filed on Mar. 9, 2017, now Pat. No. 10,678,271.

(60) Provisional application No. 62/306,419, filed on Mar. 10, 2016.

(51) Int. Cl.
| | | |
|---|---|---|
| *G05D 7/00* | (2006.01) | |
| *F04D 19/00* | (2006.01) | |
| *G01M 15/05* | (2006.01) | |
| *G05B 6/02* | (2006.01) | |
| *G05D 7/06* | (2006.01) | |
| *G06N 20/00* | (2019.01) | |
| *G09B 9/00* | (2006.01) | |
| *G09B 25/02* | (2006.01) | |

(52) U.S. Cl.
CPC ......... *G05D 7/0635* (2013.01); *F04D 19/002* (2013.01); *G01M 15/05* (2013.01); *G05B 6/02* (2013.01); *G06N 20/00* (2019.01); *G09B 9/00* (2013.01); *G09B 25/02* (2013.01)

(58) Field of Classification Search
CPC .... G05D 7/0635; G06N 20/00; F04D 19/002; G01M 15/05; G05B 6/02; G09B 9/00; G09B 25/02
USPC ........................................................ 434/126
See application file for complete search history.

(56) References Cited

U.S. PATENT DOCUMENTS

2006/0205337 A1 9/2006 Honda et al.

*Primary Examiner* — Kesha Frisby
(74) *Attorney, Agent, or Firm* — Rutan & Tucker LLP; Hani Z. Sayed

(57) ABSTRACT

An apparatus and methods are provided for a portable mass airflow (MAF) training module configured to simulate an air intake into an internal combustion engine. An in-line blower draws an airflow through an air filter by way of a first air duct and a second air duct. A throttle assembly is coupled between the first air duct and the second air duct. The throttle assembly includes a throttle plate that may be rotated to regulate the airflow. The power output of the in-line blower is variable to simulate the air intake of various sizes of the internal combustion engine. A MAF sensor and a duct velocity sensor are configured to provide airflow information. The portable MAF training module enables a practitioner to select a desired throttle setting and observe a resultant mass airflow through the portable MAF training module that is measured by the MAF sensor.

20 Claims, 11 Drawing Sheets

PORTABLE MASS AIRFLOW TRAINING MODULE

PRIORITY

This application claims the benefit of and priority to U.S. patent application Ser. No. 16/867,787 filed May 6, 2020 and U.S. patent application Ser. No. 15/454,891 filed Mar. 9, 2017, issued U.S. Pat. No. 10,678,271 and U.S. Provisional Application, entitled "Portable Mass Airflow Training Module," filed on Mar. 10, 2016 and having application Ser. No. 62/306,419.

FIELD

The field of the present disclosure generally relates to mass airflow sensor devices. More particularly, the field of the invention relates to an apparatus and a method for a portable mass airflow training module for demonstrating operation of a mass airflow sensor and an air filter at substantially all fluid flow levels, wherein the fluid flow levels are controlled by a throttle assembly.

BACKGROUND

A mass airflow ("MAF") sensor is generally used to determine a mass flowrate of air entering a fuel-injected internal combustion engine of a motor vehicle. Information regarding the mass flowrate of air is necessary for an engine control unit (ECU) to balance and deliver a correct quantity of fuel to the engine in view of variations in air density due to changes in ambient temperature and pressure. Unfortunately, those seeking to learn about how a MAF sensor operates must either work in a mechanic's garage, or teach themselves on their own time, using their own resources. Furthermore, most shops, garages and dealerships lack an ability to adequately evaluate MAF sensor calibrations. As a result, many misconceptions exist regarding the functionality of MAF sensors and the inter-relation of MAF sensors with various components under the hood of a motor vehicle, such as an air filter.

One common misconception is that oil from an air filter may cause failure of a MAF sensor under normal driving conditions. In reality, however, MAF sensor failure may be attributable, in many instances, to any of various issues that are unrelated to the air filter. For example, a MAF sensor may fail due to trace levels of silicone potting compound that is used in the manufacturing process of MAF sensors, delamination of sensing elements in the thin film of some sensors, and/or the "chimney effect" wherein certain compounds migrate up the intake tract and coalesce on any of various surfaces, especially surfaces of sensing elements. In essence, the MAF sensor may contaminate itself, irrespective of any oil from the air filter. Moreover, in some instances, contamination may be due to motor oil carried with blow-by gases; a condition where oil vapor from combustion is re-circulated into the vehicle's intake tract. Such misconceptions have led many motor vehicle owners to be mistakenly advised to purchase a new MAF sensor in addition to replacing a dirty air filter with a new air filter.

In general, demonstrating causes of MAF sensor failure is problematic due to a difficulty in illustrating how various components cooperate during operation of an internal combustion engine. Furthermore, many authorized dealerships, as well as members of the automotive industry, simply are left to speculate regarding a root cause of MAF sensor failure, due to a lack of test equipment necessary to demonstrate MAF sensor failure. As such, there is a need for a portable MAF training module that may be configured to demonstrate operation of a MAF sensor during various desired levels of air flow.

SUMMARY

The present invention discloses an apparatus and a method for a portable mass airflow (MAF) training module configured to simulate an air intake into an internal combustion engine. The portable MAF training module comprises an in-line blower that is configured to draw an air flow through an air filter by way of a first air duct and a second air duct. A throttle assembly is coupled between the first air duct and the second air duct. The throttle assembly is comprised of a throttle control valve that includes a throttle plate that may be rotated to regulate the airflow through the portable MAF training module. In some embodiments, the power output of the in-line blower may be variable so as to facilitate simulating the air intake of different sizes of the internal combustion engine. In some embodiments, differently-sized in-line blowers may be used to simulate the air intake of different sizes of the internal combustion engine. A MAF sensor and a duct velocity sensor are coupled with the second air duct and configured to provide airflow information. The portable MAF training module is configured to enable a practitioner to select a desired throttle setting and observe a resultant mass airflow through the portable MAF training module that is measured by the MAF sensor. In some embodiments, the portable MAF training module is configured to demonstrate a relationship between the throttle setting, the mass airflow moving through the portable MAF training module, and a differential pressure occurring across the air filter. An outer enclosure is configured to house one or more components comprising the portable MAF training module, including at least the in-line blower and the throttle assembly.

In an exemplary embodiment, a portable MAF training module configured to simulate an air intake into an internal combustion engine comprises an in-line blower that is configured to draw an airflow through an air filter by way of a first air duct and a second air duct; a throttle assembly that is coupled between the first air duct and the second air duct; a MAF sensor and a duct velocity sensor that are coupled with the second air duct and configured to provide airflow and air velocity information; and an outer enclosure that is configured to house the in-line blower and the throttle assembly.

In another exemplary embodiment, the outer enclosure is comprised of a filter-housing region that is configured to interface with the air filter. In another exemplary embodiment, at least a differential pressure sensor and a filter air velocity sensor are coupled with the filter-housing region, near the air filter, the differential pressure sensor being configured to measure a difference between ambient air pressure and an air pressure within the filter-housing region during operation of the in-line blower at various throttle positions. In another exemplary embodiment, an opening is disposed in the outer enclosure, opposite of the filter-housing region to receive at least a portion of the in-line blower, the opening being configured to provide an exit for the airflow being propelled by the in-line blower. In another exemplary embodiment, the in-line blower is comprised of an outer, substantially cylindrical canister that retains a fan comprising a plurality of blades that are configured to optimize the airflow drawn through the portable MAF training module, and wherein at least the power output of the in-line blower is variable so as to simulate the air intake of various sizes of the internal combustion engine.

In another exemplary embodiment, the outer enclosure is formed of a rigid, transparent material to facilitate observation and analysis of various components comprising the portable MAF training module. In another exemplary embodiment, the outer enclosure is configured to provide a hermetic seal to components housed therein so as to provide a controlled environment for testing and analysis. In another exemplary embodiment, a mounting panel is disposed within the outer enclosure to provide a surface area for mounting certain control peripheral devices, the mounting panel being comprised of a relatively lightweight, rigid material such as aluminum or titanium, so as to minimize the weight of the MAF training module.

In another exemplary embodiment, the throttle assembly is comprised of a throttle valve that is comprised of a throttle plate that may be rotated within the throttle assembly so as to regulate the airflow through the portable MAF training module. In another exemplary embodiment, the throttle assembly is comprised of a throttle position sensor coupled with the throttle valve, the throttle position sensor being configured to directly monitor a position of the throttle valve. In another exemplary embodiment, the portable MAF training module further comprises a throttle control circuit that includes at least a frequency generator, a duty cycle modulator, a throttle controller, a position feedback, and a proportional-integral-derivative (PID) controller, and wherein an actual throttle position may be compared with a desired throttle position and a difference between the two values may be passed to the PID controller to generate an input signal to the duty cycle modulator, the throttle controller being configured to supply electric power to a motor operably connected to the throttle assembly to move the throttle valve to the desired throttle position.

In another exemplary embodiment, the portable MAF training module is coupled with an electronic device by way of a communication link, the electronic device being a device capable of receiving data output from the portable MAF training module and comprising a display area configured to display the data output by way of a suitable graphical user interface (GUI). In another exemplary embodiment, the GUI is configured to enable a practitioner to select a desired throttle setting and observe a resultant mass airflow through the portable MAF training module that is measured by the MAF sensor. In another exemplary embodiment, the GUI is configured to demonstrate a relationship between the throttle setting, the mass airflow moving through the portable MAF training module, and a differential pressure across the air filter.

In another exemplary embodiment, the portable MAF training module further comprises a MAF control appliance that is configured to simulate an accelerator pedal of a motor vehicle. In another exemplary embodiment, the MAF control appliance comprises at least one or more hardware processors, user interface logic, a throttle control, a memory, and sensor logic. In another exemplary embodiment, the one or more hardware processors are configured to receive and process electronic signals from the throttle control and the sensor logic, and wherein the one or more hardware processors are configured to communicate received signals to the user interface logic whereby the received signals may be displayed on an electronic device by way of a communication link, the electronic device being a device capable of receiving data output from the portable MAF training module and comprising a display area configured to display the data output by way of a suitable GUI. In another exemplary embodiment, the sensor logic includes one or more modules and logic suitable for receiving electronic signals from the MAF sensor and interpreting the electronic signals in terms of physical quantities, including at least mass airflow, throttle position, air velocity, differential air pressure, and filter air velocity.

In another exemplary embodiment, the GUI is comprised of a multiplicity of specific elements that are configured to enable a practitioner to operate the portable MAF training module. In another exemplary embodiment, the multiplicity of specific elements is comprised of at least a fan control bar configured to indicate a percentage of electric power being passed to the in-line blower, and one or more numerical display boxes configured to indicate an intake air velocity, a differential pressure across the air filter, and the air velocity across the air filter. In another exemplary embodiment, the multiplicity of specific elements further comprises a voltage amplitude chart and a mass airflow chart.

In an exemplary embodiment, a portable mass airflow training module for simulating an air intake of an internal combustion engine comprises: an in-line blower for causing an airflow through an air filter; a MAF sensor for measuring an airflow mass through the air filter; and a throttle assembly for regulating the airflow through the air filter.

In another exemplary embodiment, the training module further includes a filter-housing for receiving the airflow exiting the air filter. In another exemplary embodiment, a differential pressure sensor is coupled with the filter-housing for measuring a difference between ambient air pressure and an air pressure within the filter-housing. In another exemplary embodiment, an air velocity sensor is coupled with the filter-housing region for measuring the speed of the airflow through the air filter.

In another exemplary embodiment, the in-line blower is configured to output a variable power so as to simulate the air intake of various sizes of the internal combustion engine. In another exemplary embodiment, the throttle assembly includes a throttle plate that may be rotated for regulating the airflow through the training module. In another exemplary embodiment, a throttle position sensor comprising the throttle assembly is coupled with the throttle plate and configured to directly monitor a position of the throttle plate.

In another exemplary embodiment, the training module further includes a throttle control circuit that includes at least a frequency generator, a duty cycle modulator, a throttle controller, a position feedback, and a PID controller. In another exemplary embodiment, the PID controller is configured to generate an input signal to the duty cycle modulator based on a difference between an actual throttle position and a desired throttle position. In another exemplary embodiment, the throttle controller is configured to supply electric power to a motor configured to move a throttle control valve to the desired throttle position.

In another exemplary embodiment, the training module further includes a MAF control appliance for simulating an accelerator pedal of a motor vehicle. In another exemplary embodiment, the MAF control appliance comprises: a throttle controller for positioning a throttle control valve comprising the throttle assembly; a sensor logic for interpreting MAF sensor data; one or more hardware processors for processing signals received from the throttle controller and the sensor logic; a user interface logic for displaying received signals on an electronic device by way of a communication link; and a memory.

In an exemplary embodiment, a method for a portable mass airflow training module to simulate an air intake of an internal combustion engine comprises: causing an airflow through an air filter; regulating the airflow through the air filter; and measuring an airflow mass through the air filter.

In another exemplary embodiment, causing includes configuring an in-line blower to simulate the air intake of various sizes of the internal combustion engine. In another exemplary embodiment, regulating includes rotating a throttle plate comprising a throttle assembly to control the airflow through the air filter. In another exemplary embodiment, rotating includes using a throttle position sensor comprising the throttle assembly to directly monitor a position of the throttle plate.

In another exemplary embodiment, measuring includes placing a MAF sensor in contact with the airflow. In another exemplary embodiment, measuring includes simulating an accelerator pedal of a motor vehicle by way of a MAF control appliance. In another exemplary embodiment, measuring includes using a sensor logic comprising the MAF control appliance to interpret MAF sensor data. In another exemplary embodiment, measuring includes using a GUI on an electronic device to select a desired throttle setting and observe a resultant mass airflow that is detected by the MAF sensor.

BRIEF DESCRIPTION OF THE DRAWINGS

The drawings refer to embodiments of the present disclosure in which.

Figure 1:
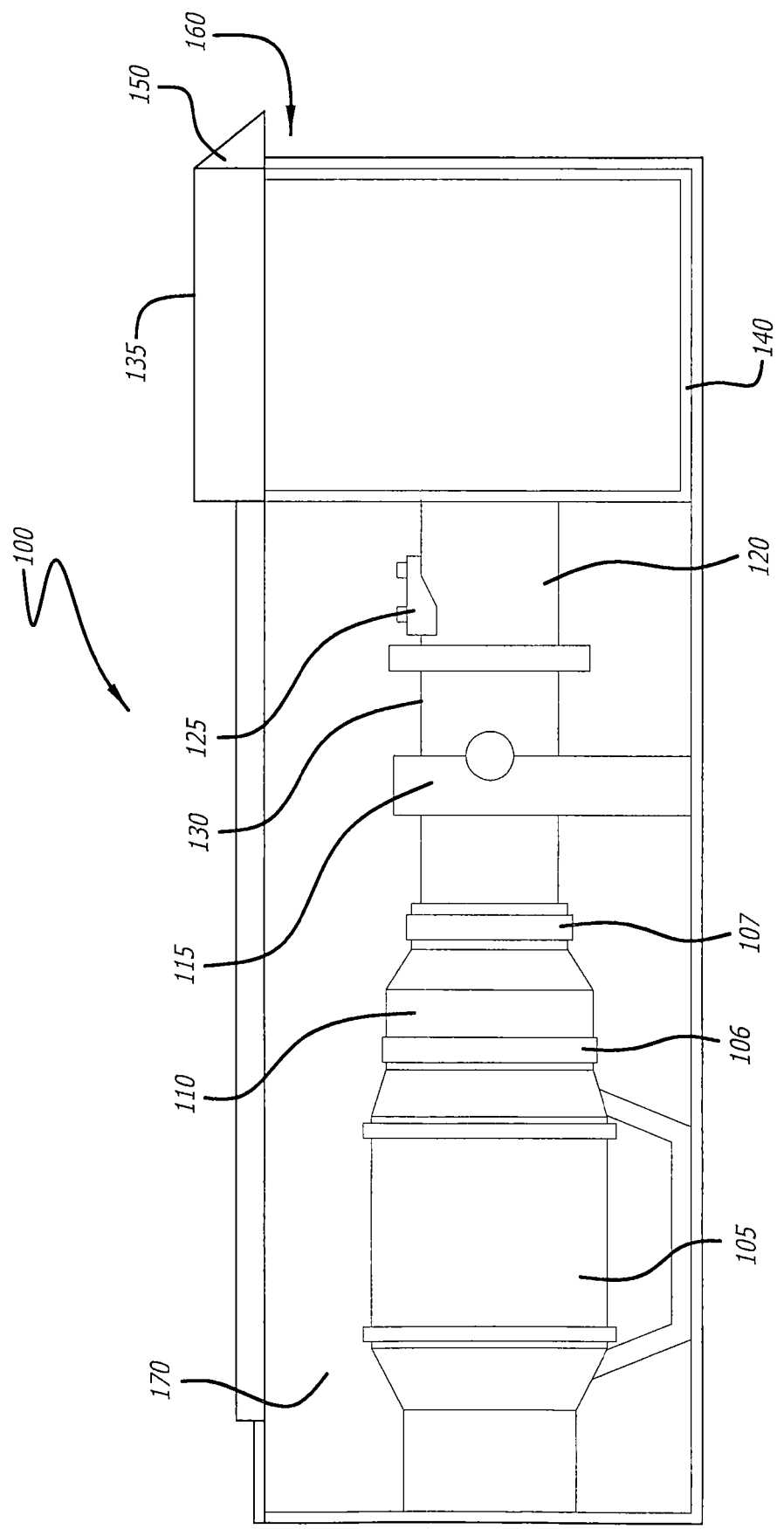
FIG. 1 illustrates a side view of an exemplary embodiment of a portable mass airflow ("MAF") training module, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first air duct," may be made. However, the specific numeric reference should not be interpreted as a literal sequential order but rather interpreted that the "first air duct" is different than a "second air duct." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and methods for a portable mass airflow ("MAF") training module that is portable and easily viewed. The portable MAF training module is configured to simulate operation of an internal combustion engine air intake system so as to demonstrate certain parameters, such as an intake airflow and a corresponding output of a MAF sensor, and display information about the parameters on an electronic device, such as a graphical user interface operating on a computer. It is envisioned that the graphical user interface may be configured to facilitate actuation of an electronic throttle valve comprising the portable MAF training module and to display the intake airflow. In one embodiment, the portable MAF training module may be configured to demonstrate a correlation between a change in throttle position and a relationship between the intake airflow as measured by the MAF sensor.

FIG. 1 illustrates an exemplary embodiment of a portable MAF training module 100, according to the present disclosure. The portable MAF training module 100 comprises an in-line blower 105, a first air duct 110, a throttle assembly 115, a second air duct 120, a MAF sensor 125, a duct velocity sensor 130, an air filter 135, a filter box 140, a differential pressure sensor 150, a filter velocity sensor 160, and an outer enclosure 170. Embodiments of the portable MAF training module 100 may be configured so as to intake air through the air filter 135 and the filter box 140, such that various sensors, including the MAF sensor 125, are capable of receiving data relating to a plurality of airflow rates, ranging from idle to full throttle. In some embodiments, the airflow rates are selected to simulate an air intake into an internal combustion engine operating at various speeds, ranging from an idle speed to a full-throttle speed. It is contemplated that the airflow detected by the MAF sensor 125 may be compared to a second MAF sensor so as to determine functionality and preferably, to note any erroneous changes in the data relating to the airflow rates.

Figure 2:
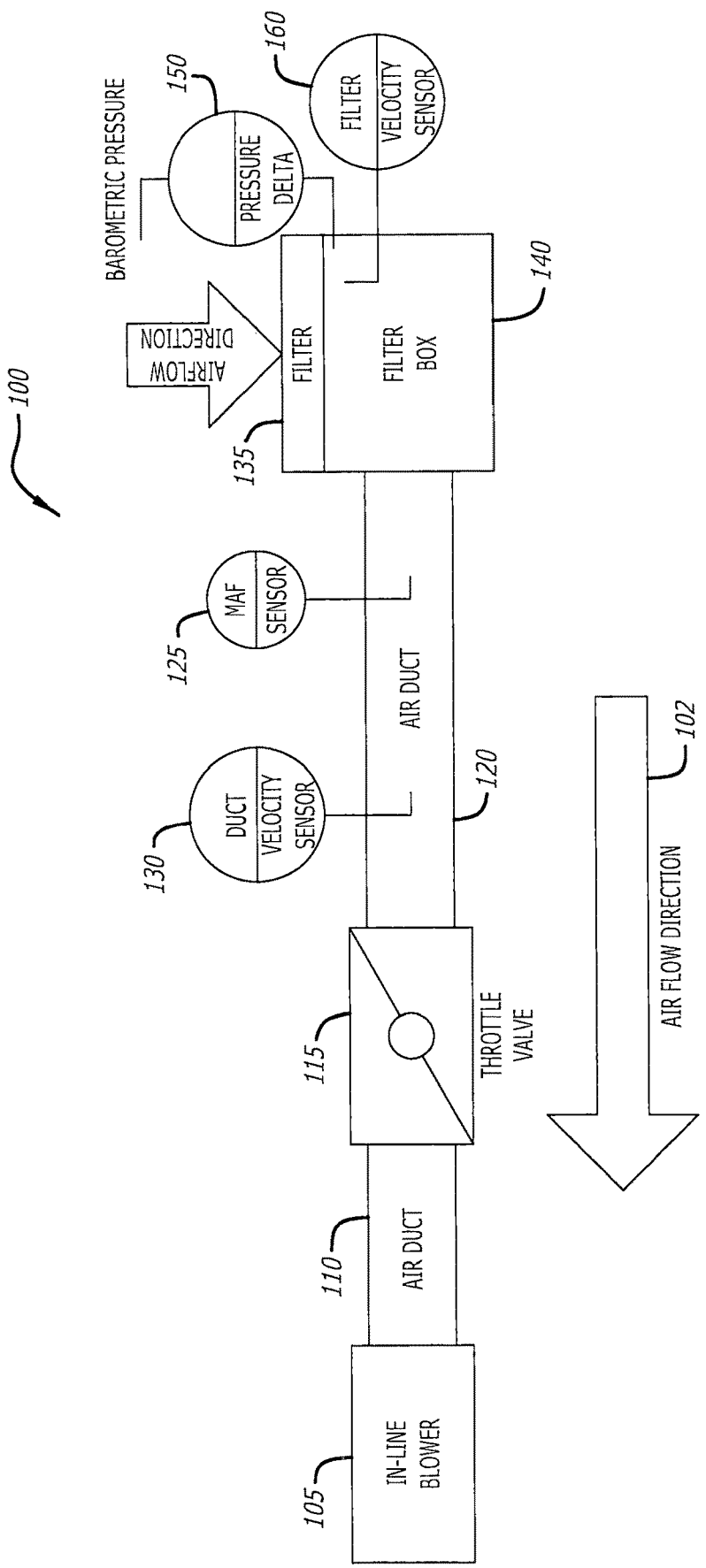
FIG. 2 illustrates a schematic diagram of the portable MAF training module illustrated in FIG. 1, according to the present disclosure.

FIG. 2 illustrates a schematic diagram of the portable MAF training module 100, illustrated in FIG. 1, according to the present disclosure. In general, the portable MAF training module 100 is configured to simulate the intake or induction side of an operating internal combustion engine, while maintaining portability for transport from one location to another for teaching and presentation purposes. As such, it is contemplated that the portable mass airflow training module 100 may be powered by way of a rechargeable battery network (not shown), and/or include the capability to receive electrical power from an external source.

As shown in FIGS. 1-2, the in-line blower 105 cooperates with the throttle assembly 115 by way of the first air duct 110, which is longitudinally disposed therebetween. As such, the first air duct 110 provides a medium for fluid communication between the in-line blower 105 and the throttle assembly 115. In the illustrated embodiment of FIG. 1, the in-line blower 105 may be coupled to a first end of the first air duct 110 by way of an optional coupler, such as a clamp 106, or any other suitable fastener. A second end of the first air duct 106 may be coupled to the throttle assembly 115 by way of a similar fastener 107.

The throttle assembly 115 interfaces with the combination of the air filter 135 and the filter box 140 by way of the second air duct 120, which is longitudinally disposed therebetween such that the second air duct 120 provides fluid communication between the throttle assembly 115, the filter box 140, and air filter 135. In one embodiment, each of the first and second air ducts 110, 120 are comprised of tubular members formed of Plexiglas, however any other suitable material may be used without limitation, including, for example, various plastics, metals, carbon fiber, and the like.

In the embodiment of FIGS. 1-2, the in-line blower 105 is configured to draw an airflow 102 through the air filter 135 such that the airflow may be analyzed by one or more sensors, including the MAF sensor 125. In one embodiment, the MAF sensor 125 is coupled with the second air duct 120 such that it extends into an interior of the second air duct. Similarly, the duct velocity sensor 130 may be coupled with the second air duct 120. It is contemplated, however, that the MAF sensor 125 and the duct velocity sensor 130 may be disposed in various other locations of the portable MAF training module 100 without extending beyond the spirit and scope of the present disclosure.

In general, the air box 140 is configured to accept and interface with the air filter 135. Although the air filter 135 shown herein is comprised of a square shape, the air filter 135 may be comprised any shape and size. Accordingly, the air box 140 may be configured to accept any size and shape of the air filter 135 that is intended to be coupled with the air box 140, without limitation. The air filter 135 typically is comprised of pleated paper, foam, cotton, spun fiberglass, or other known suitable filter materials. Further, a plurality of sensors may be coupled with the filter box 140, near the air filter 135, and configured to measure various parameters, including, but not limited to pressure, temperature, filter air velocity, and the like. In the embodiment of FIGS. 1-2, the differential pressure sensor 150 is disposed in the filter box 140 near the air filter 135. It is contemplated that in some embodiments, a filter air velocity sensor 160 may also be coupled with the filter box 140 near the air filter 135, as indicated in FIG. 2.

Figure 3:
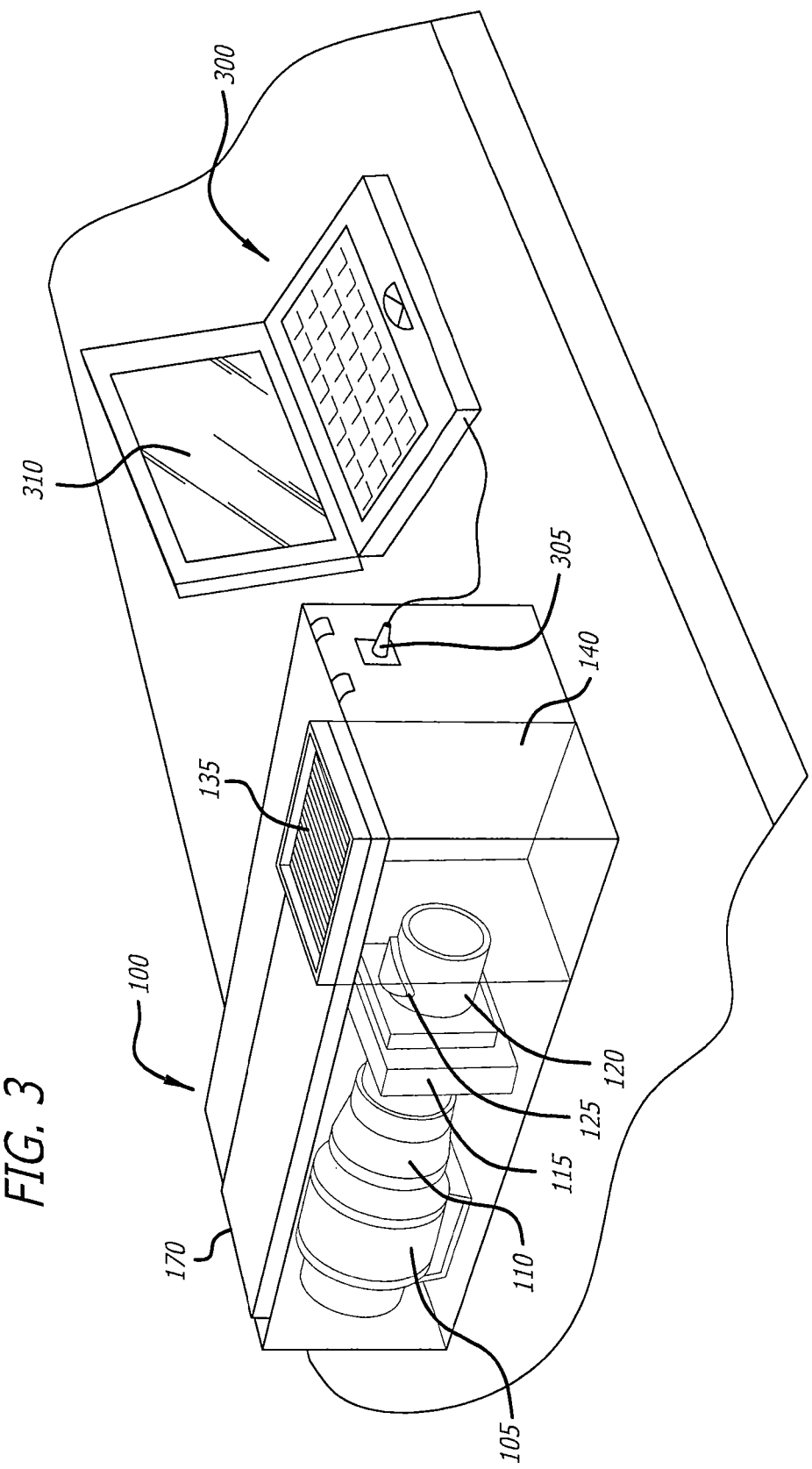
FIG. 3 illustrates a perspective view of an exemplary embodiment of a portable MAF training module coupled with exemplary diagnostic equipment.

FIG. 3 illustrates a perspective view of an exemplary embodiment of a portable MAF training module 100 coupled with exemplary diagnostic equipment, comprising an electronic device 300, by way of a communication link 305. It is contemplated that the electronic device 300 may be any device that is capable of receiving data output from the one or more sensors of the portable MAF training module 100, including, but not limited to, smartphones, tablets, laptops, personal computers, and the like. The communication link 305 may be comprised of any standard cable or interface, including by way of non-limiting example, USB, serial, ethernet, firewire, and the like. In some embodiments, communication link 305 may be comprised of a wireless connection that operates by way of a suitable wireless protocol, such as Wi-Fi, Near Field Communication (NFC), Bluetooth, or other similar protocol. As will be appreciated, the electronic device 300 preferably comprises a display area 310 that is configured to display a suitable graphical user interface (GUI), as discussed herein.

Figure 4:
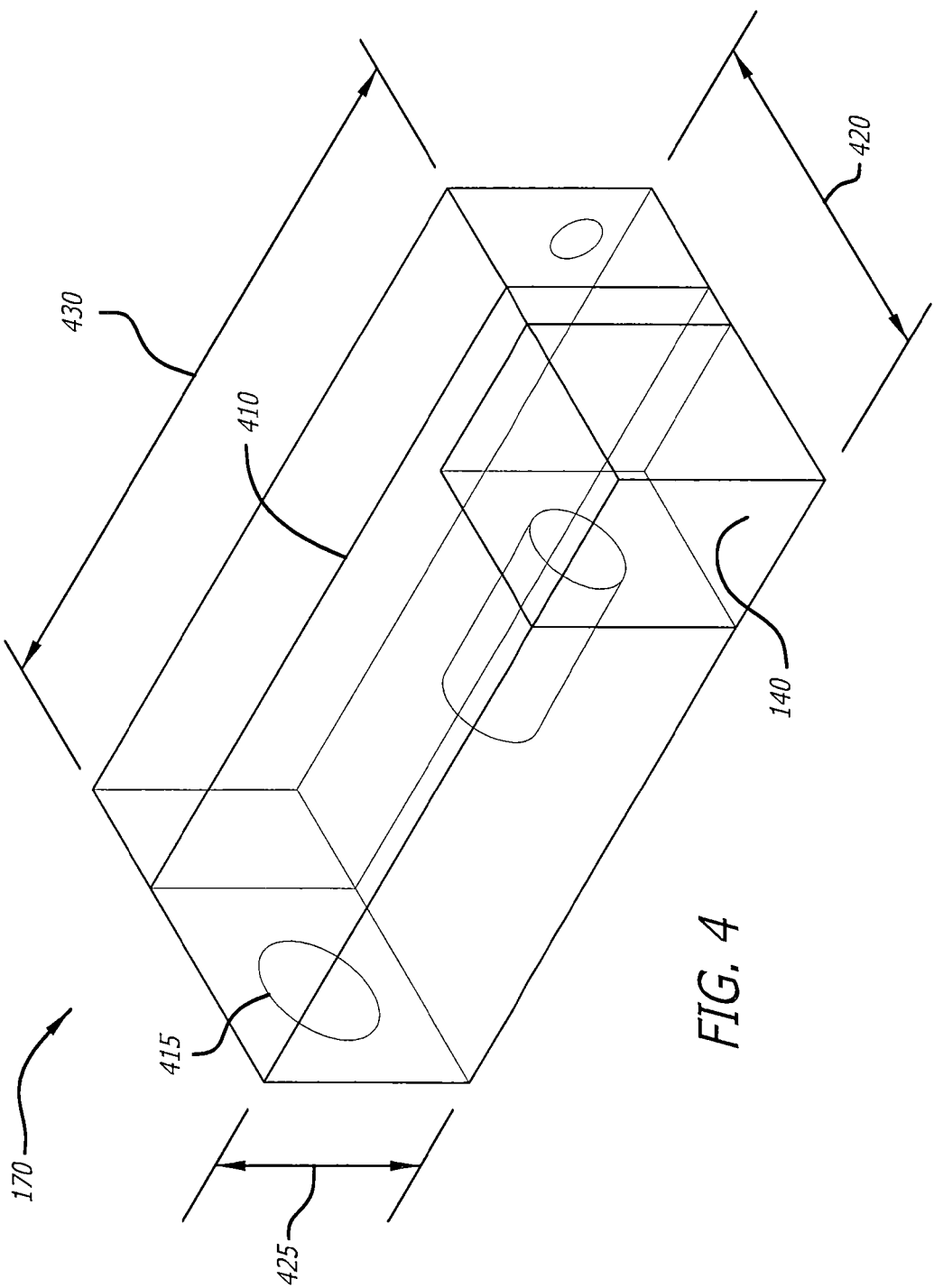
FIG. 4 is an isometric view illustrating an exemplary embodiment of an outer enclosure that may be incorporated into the portable MAF training module of FIG. 1.

FIG. 4 is an isometric view illustrating an exemplary embodiment of an outer enclosure 170 that may be incorporated into the portable MAF training module 100 according to the present disclosure. As will be appreciated, the outer enclosure 170 may be configured to increase portability of the portable MAF training module 100. In some embodiments, the outer enclosure 170 may be further configured to provide a hermetic seal to components housed therein to provide a controlled environment for testing and analysis. The outer enclosure 170 may be formed of plexiglass, or any other suitable, transparent material. It should be understood that a relatively transparent material is desired to facilitate observation and analysis of the various components comprising the portable MAF training module 100.

In one embodiment, a mounting panel 410 may be disposed within the outer enclosure 170 to provide a surface area for mounting certain control peripheral devices, such as, by way of non-limiting example, a throttle controller, a computer hardware interface, various power supplies, and the like. It is desirable for the mounting panel 410 to be comprised of a relatively lightweight, rigid material such as aluminum or titanium, so as to minimize the weight of the MAF training module 100. The mounting panel 410 may comprise a relatively dark color so as to remove the control peripheral devices from plain view and emphasize observation of the components comprising the MAF training module 100. Any number of cutouts, or openings, may be provided on the mounting panel 410 so that wire loom, or other types of wiring may be routed from either side of the mounting panel 410 of the portable MAF training module 100.

As shown in FIG. 4, the outer enclosure 170 may comprise a filter-housing region 140 that is comprised of an opening configured to receive the air filter 135. As mentioned above, although the filter-housing region 140 is shown in a generally square configuration, the filter-housing region 140 may be adapted to receive air filters of any of various shapes and sizes, without limitation. Further, an opening 415 may be disposed in the outer enclosure 170, generally opposite of the filter-housing region 140 so as to receive at least a portion the in-line blower 105. In some embodiments, the opening 415 may provide an exit for the airflow 102 being propelled by the in-line blower 105. In some embodiments, however, the opening 415 may serve to provide a mounting point, or a support, for the in-line blower 105.

It is contemplated that in one embodiment, the outer enclosure 170 may be comprised of a width 420 of substantially 13 inches, a height 425 of substantially 9 inches, and a depth 430 of substantially 25 inches. It should be understood, however, that any of the width 420, the height 425, and the depth 430 of the outer enclosure 170 may be varied, without limitation, depending on the shapes and sizes of the components comprising the portable MAF training module 100 that are selected to be housed within the outer enclosure 170.

Figure 5A:
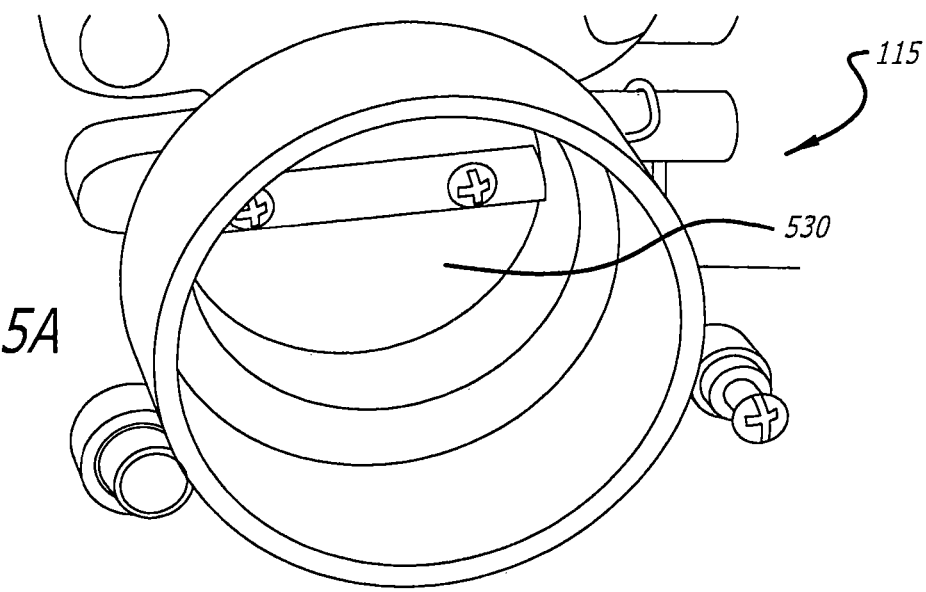
FIG. 5A illustrates a perspective view of an exemplary throttle body that may be incorporated into the portable MAF training module shown in FIG. 1.
Figure 5B:
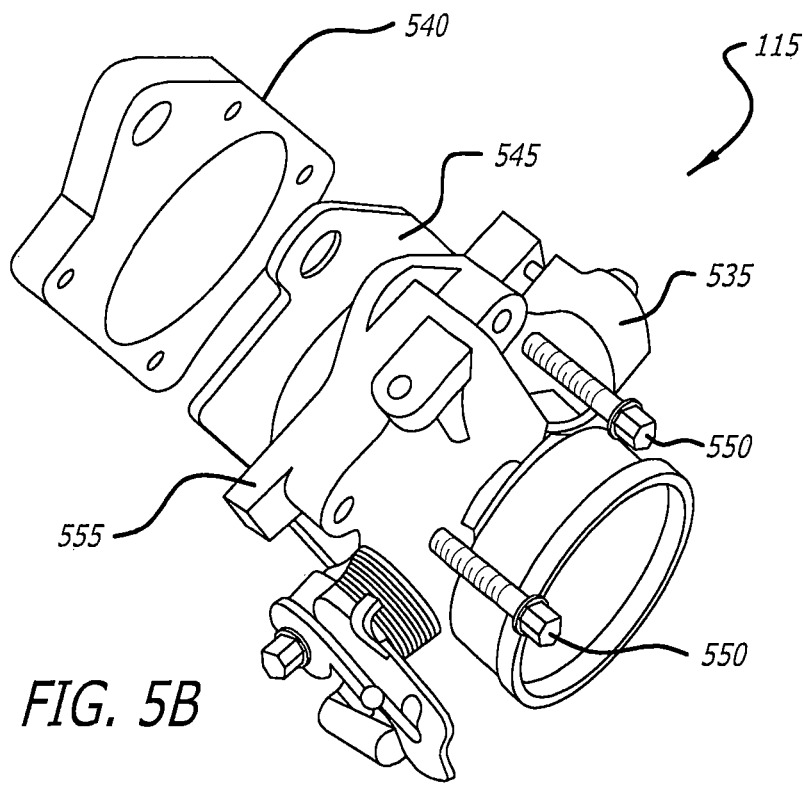
FIG. 5B illustrates an exploded view of an exemplary throttle body that may be incorporated into the portable MAF training module of FIG. 1.

As will be recognized, in the case of conventional internal combustion engines, a throttle assembly generally is configured to regulate a desired amount of air entering the engine during operation. Similarly, in the embodiment of FIGS. 1-2, the amount of airflow 102 entering the portable MAF training module 100 may be modulated by the throttle assembly 115. As shown in FIGS. 5A-5B, the throttle assembly 115 may be comprised of a throttle valve 530, a plenum chamber 540, a gasket 545, a plurality of bolts 550, and a throttle housing 555. The gasket 545 may be sealed between the throttle housing 555 and the plenum chamber 540 using the plurality of bolts 550. The throttle assembly 115 may further comprise a throttle position sensor 535 that is configured to monitor throttle position. The throttle position sensor 535 generally may be disposed on the butterfly spindle/shaft so that it may directly monitor the position of the throttle valve 530. In one embodiment, an extra closed-throttle position sensor (not shown) may be utilized to indicate that the throttle valve 530 is completely closed. As best shown in FIG. 5B, the throttle valve 530 may be comprised of a throttle plate that may be rotated within the throttle assembly 115 so as to regulate airflow 102 therethrough.

Figure 6:
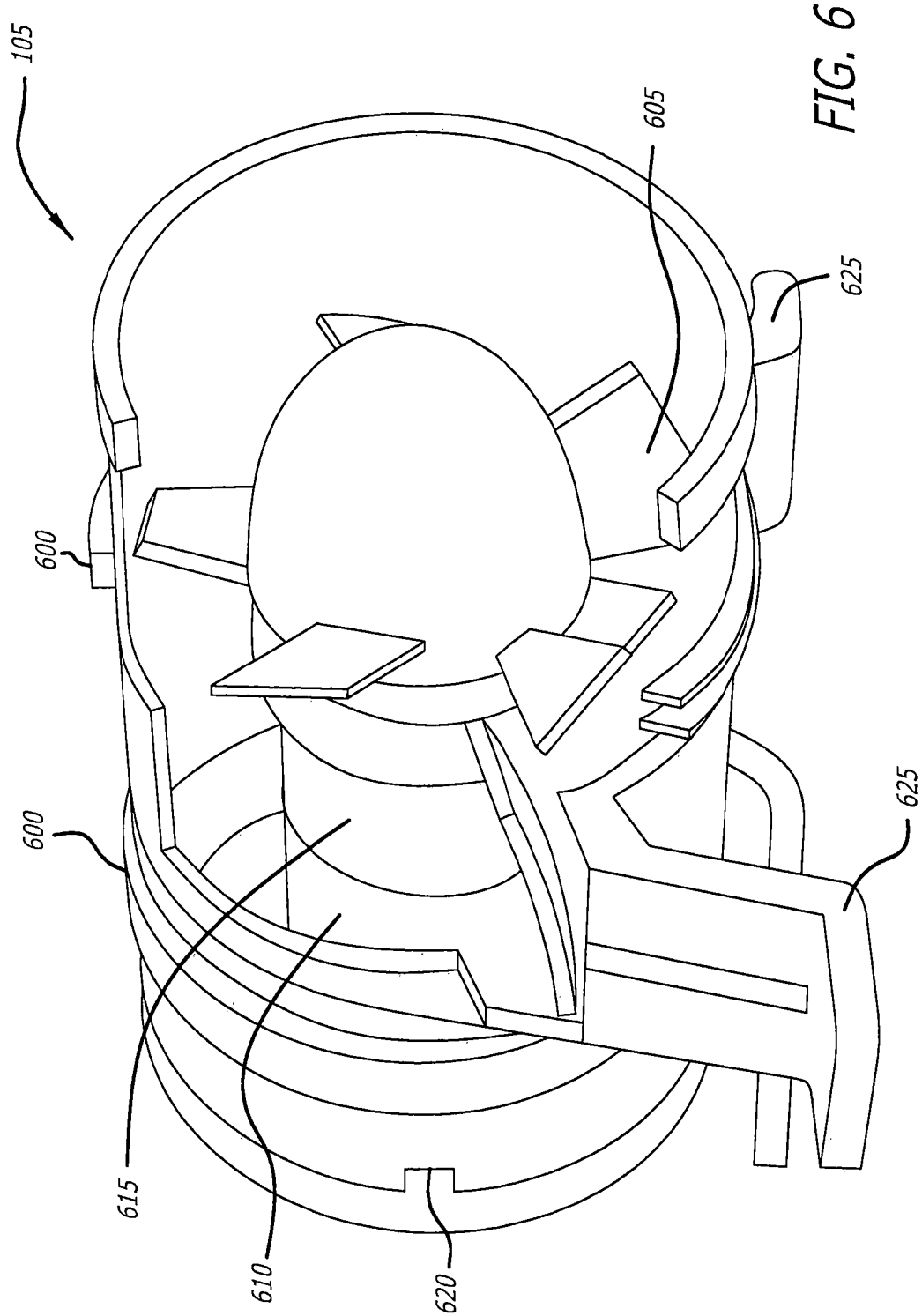
FIG. 6 illustrates a cut-away view of an exemplary embodiment of an in-line blower that may be incorporated into the portable MAF training module illustrated in FIG. 1.

FIG. 6 is a cut away view of an exemplary in-line blower 105 that may be incorporated into the portable MAF training module 100, according to the present disclosure. In the embodiment illustrated in FIG. 6, the in-line blower 105 is configured to be oriented longitudinally within the outer enclosure 170. It is contemplated, however, that the in-line blower 105 may be oriented in a vertical orientation, or in any other suitable orientation within the outer enclosure 170 without limitation. In one embodiment, the in-line blower 105 comprises an outer, substantially cylindrical canister 600 that retains a fan 605 comprising a plurality of blades that are configured to optimize the airflow 102 drawn through the portable MAF training module 100.

A low-amp draw motor 610 may be incorporated into the in-line blower 105 so as to increase battery life and longevity of the in-line blower. A motor cap 615 may be coupled with the motor 610 to seal electrical wiring and the like. The cylindrical canister 600 may comprise a plurality of ribs 620 configured to reduce distortion of the canister and increase the structural integrity of the in-line blower 105. Preferably, the in-line blower 105 comprises a plurality of mounting points 625 that facilitate installation of the in-line blower 105 within the outer enclosure 170, as described herein. It is contemplated that at least the power output of the in-line blower 105 is variable so as to simulate engines of various desired sizes. For example, in one embodiment, the in-line blower 105 is configured to simulate the air intake of a 6-cylinder engine. It should be understood, however, that the in-line blower 105 may be adapted to simulate the air intake of various other sizes of engine, such as, for example, 4-cylinder engines, 8-cylinder engines, and the like, without limitation.

As will be appreciated, electronic throttle control systems generally are utilized to electronically couple an accelerator pedal to the throttle, thereby replacing a mechanical linkage. For example, a typical electronic throttle control system may be comprised of three major components: (i) an accelerator pedal; (ii) a throttle valve; and (iii) a powertrain or engine control module. An engine control module generally is configured to employ logic to determine an optimal throttle position based on data measured by a variety of sensors, including, by way of non-limiting example, accelerator pedal position sensors, engine speed sensors, vehicle speed sensors, and the like. An electric motor may be used to move the throttle valve to a desired position by way of one or more algorithms stored within the engine control module.

Figure 7:
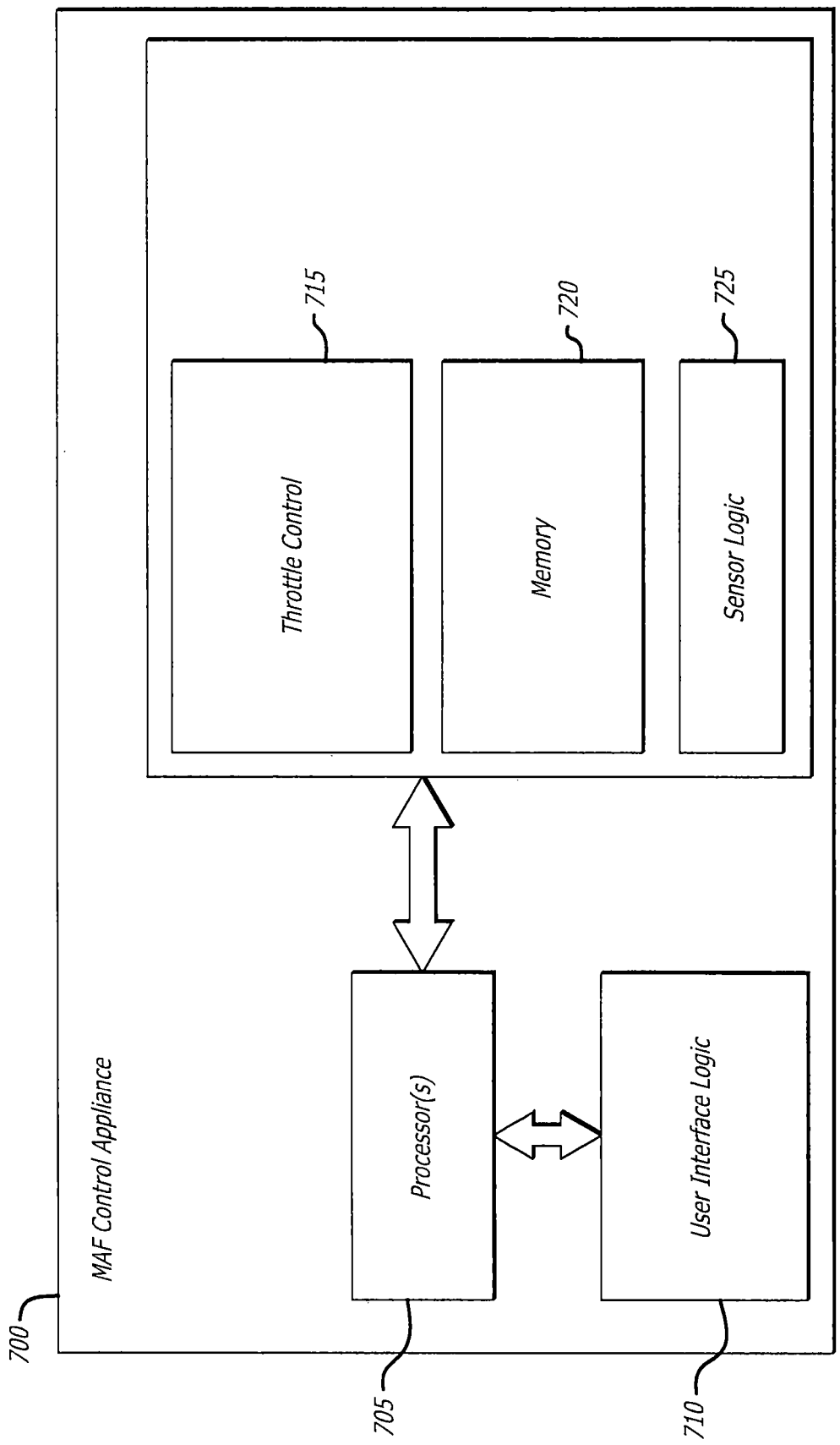
FIG. 7 is a schematic diagram illustrating an exemplary MAF control appliance of the portable MAF training module illustrated in FIG. 1.

Accordingly, FIG. 7 is a schematic diagram illustrating an exemplary MAF control appliance 700 comprising the portable MAF training module 100 and configured to simulate an engine control module of a motor vehicle. In the illustrated embodiment, the MAF control appliance 700 comprises one or more hardware processors 705, user interface logic 710, a throttle control 715, a memory 720, and sensor logic 725. The hardware processors 705 may be configured to receive and process electronic signals from the throttle control 715 and the sensor logic 725. The received signals may then be communicated by the hardware processors 710 to the user interface logic 710 whereby the signals may be displayed on the electronic device 300, as discussed herein. In some embodiments, the sensor logic 725 may include various modules and logic suitable for receiving electronic signals from the MAF sensor 125, for example, and interpreting the electronic signals in terms of physical quantities, such as mass airflow, throttle position, air velocity, differential air pressure, filter air velocity, and the like.

Figure 8:
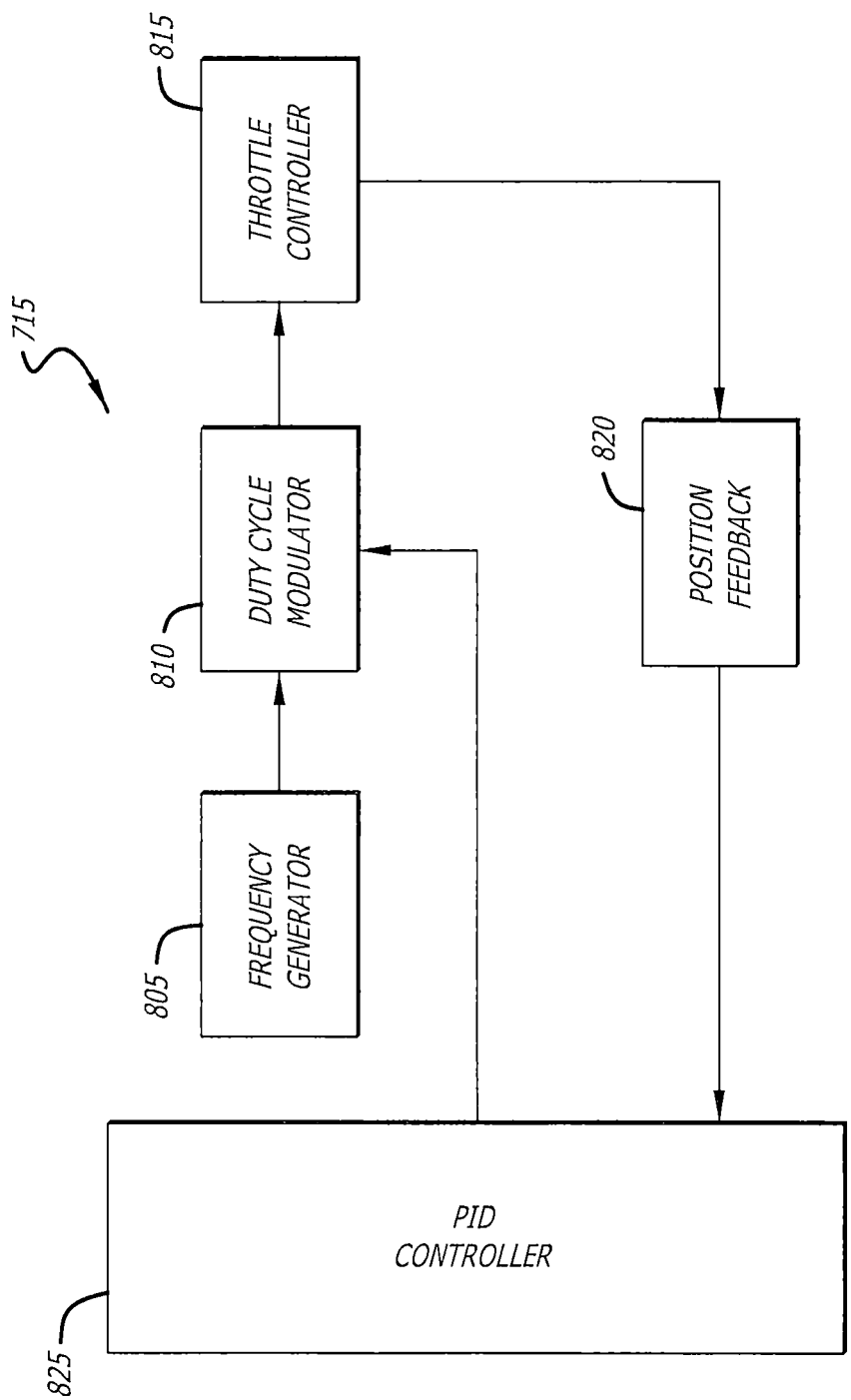
FIG. 8 is a schematic diagram illustrating an exemplary throttle control that may be coupled with the portable MAF training module illustrated in FIG. 1.

FIG. 8 is a schematic diagram illustrating an exemplary throttle control 715 that may be incorporated into the portable MAF training module 100, as described herein. The throttle control 715 comprises a frequency generator 805, a duty cycle modulator 810, a throttle controller 815, a position feedback 820, and a proportional-integral-derivative (PID) controller 825. The throttle control 715 may be modulated based on user input, and may adjust based on signals received from the throttle position sensor 535 that is configured to measure the position of the throttle valve 530, discussed with respect to FIGS. 5A-5B The actual throttle position may be compared with a desired value and a difference between the two values may be passed to the PID controller 825 to generate an input signal to the duty cycle modulator 810. The throttle controller 815 may be configured to supply electric power to a motor operably connected to the throttle assembly 115 so as to move the throttle valve 530 to the desired position. For a given throttle model, the associated PID parameters may be calculated by way of known control theory techniques, such as root locus and bode diagrams. Further, in some embodiments, a transistor and a relay may form a simple drive circuit that generates a pulse-width modulation (PWM) drive signal to operate the motor that moves the throttle valve 530. It is contemplated that the duty cycle may be controlled by way of a processor to regulate the electric current directed to the motor. A further mechanism may also be used to control the directional rotation of the motor.

With reference, again, to FIGS. 1-3, it is contemplated that the MAF sensor 125 may be comprised of any of common variations of MAF sensors—a thin-film and/or a hot wire. Both variations of MAF sensor are used almost exclusively on electronic fuel injection engines. Both sensor designs output a substantially 0.0-5.0 volt, a PWM signal that is proportional to the MAF rate, or a CAN signal, and both sensors have an intake air temperature (IAT) sensor incorporated into their housings for most post-OBDII vehicles. Vehicles prior to 1996 could have a MAF sensor without an intake air temperature sensor (IAT). For example, an engine's air/fuel ratio may be accurately controlled with a MAF sensor coupled with an oxygen sensor in lieu of an IAT. The MAF sensor provides the measured airflow information to the engine's ECU closed-loop controller algorithm, and the oxygen sensor provides exhaust gas oxygen concentration feedback that may be used to generate minor corrections to the fuel-trim. It should be understood that any type of MAF sensor may be used individually or in combination with additional sensors and inputs, such that an engine's ECU may be configured to determine the mass flow rate of intake air into the engine.

The differential pressure sensor 150 may be configured to measure a difference between ambient air pressure and an air pressure within the filter box 140 generated by the in-line blower 105 as it draws the airflow 102 therethrough. The pressure sensor 150 may be comprised of multiple ports, such as a high port and a low port. For example, when the high port detects a pressure that is greater than a pressure detected at the low port, a positive signal is returned by the differential pressure sensor 150. Alternatively, when the pressure detected at the high port is lower than the pressure detected at the low port, a negative signal is returned. Meanwhile, when both ports are exposed to the same air pressure, the difference between the realized pressures at the ports is substantially zero.

Moreover, the differential pressure sensor 150 may be used alone or in combination with other sensors to indirectly measure other variables such as air flow, speed, and altitude. As will be appreciated, the differential pressure sensor 150 may be implemented as a pressure transducer, a pressure transmitter, a pressure sender, a pressure indicator, a piezometer, a manometer, and the like. As used herein, pressure is an expression of the force required to stop a fluid from expanding, and is usually stated in terms of force per unit area. The differential pressure sensor 150 may operate as a transducer, wherein it generates a signal as a function of the pressure imposed. It is envisioned that any type of pressure sensor may comprise the differential pressure sensor 150, such as, by way of non-limiting example, an absolute pressure sensor, a gauge pressure sensor, a vacuum pressure sensor, a differential pressure sensor, and/or a sealed pressure sensor, alone or in combination, without limitation.

As disclosed herein, various operating parameters associated with the portable MAF training module 100 may be displayed by way of a graphical user interface operating on an electronic device 300. It is envisioned that the graphical user interface may be configured to enable a practitioner to control the throttle valve 530 by way of the electronic device 300. To this end, FIGS. 9A-9C illustrate various exemplary embodiments of graphical user interfaces (GUIs) that may be implemented on the electronic device 300 in accordance with the present disclosure.

Figure 9A:
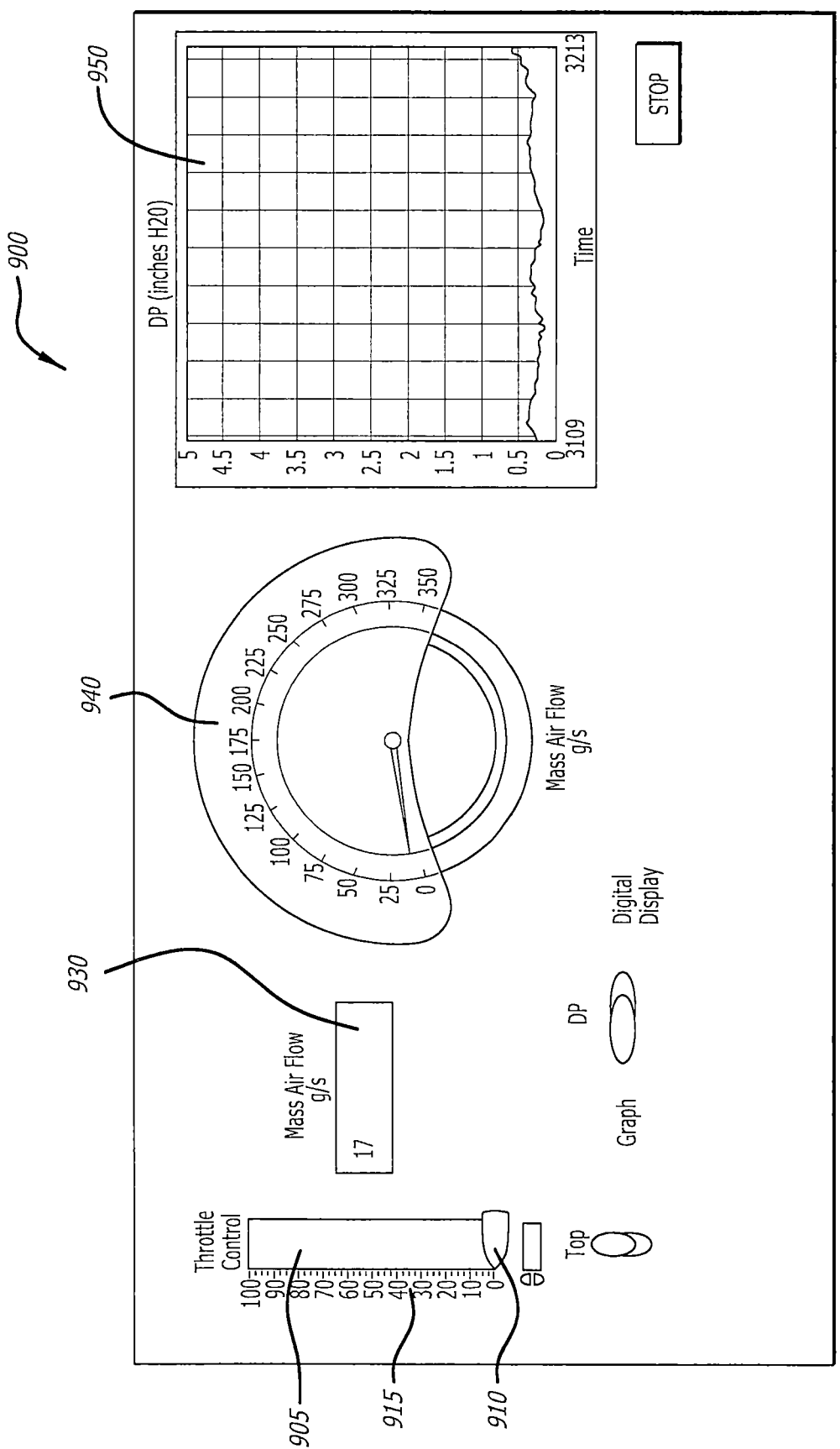
FIG. 9A illustrates an exemplary embodiment of a graphical user interface (GUI) displaying an engine-idle airflow passing through a portable MAF training module.
Figure 9B:
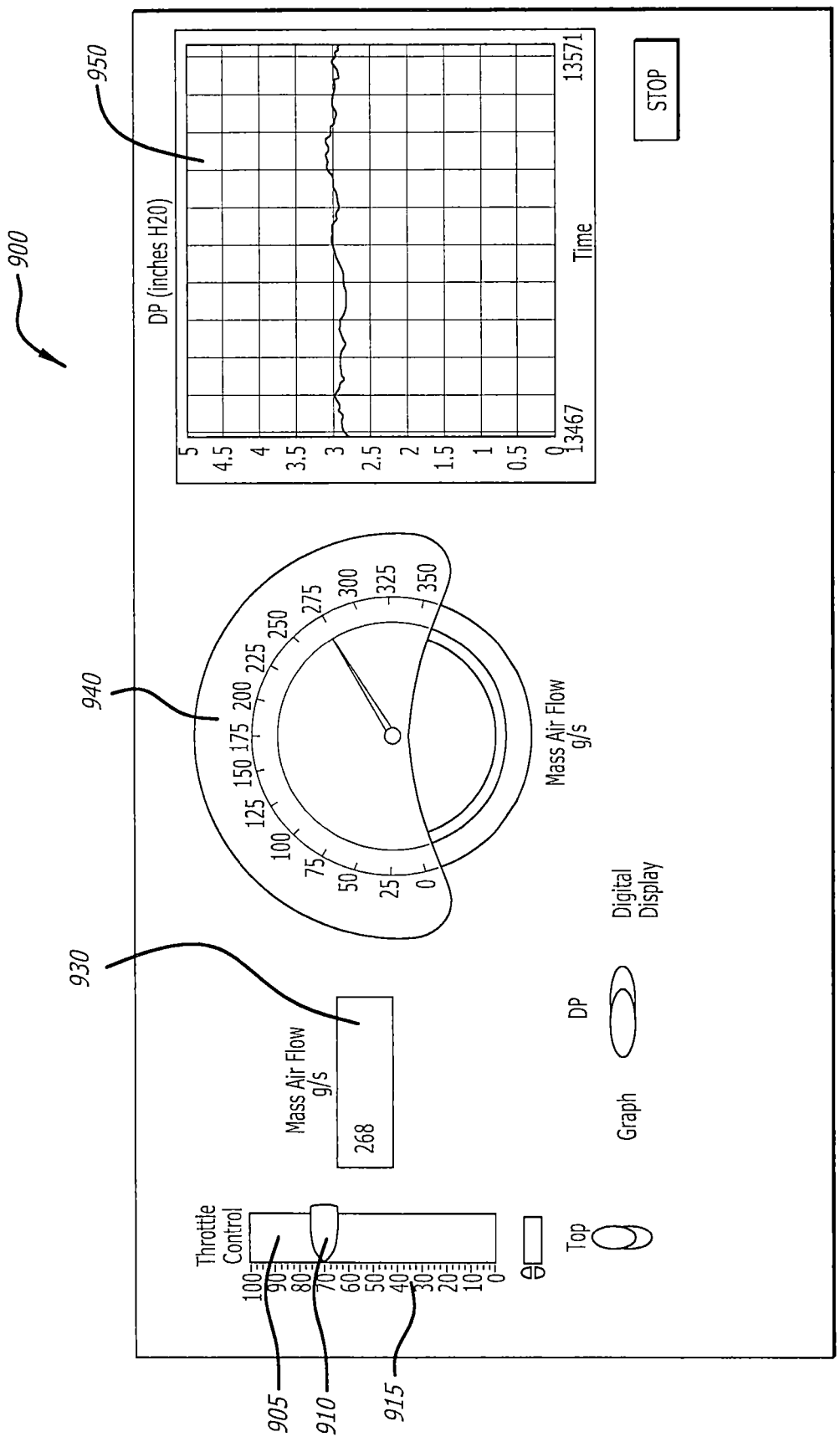
FIG. 9B illustrates a condition of the GUI of FIG. 9A during relatively high airflow passing through a portable MAF training module.
Figure 9C:
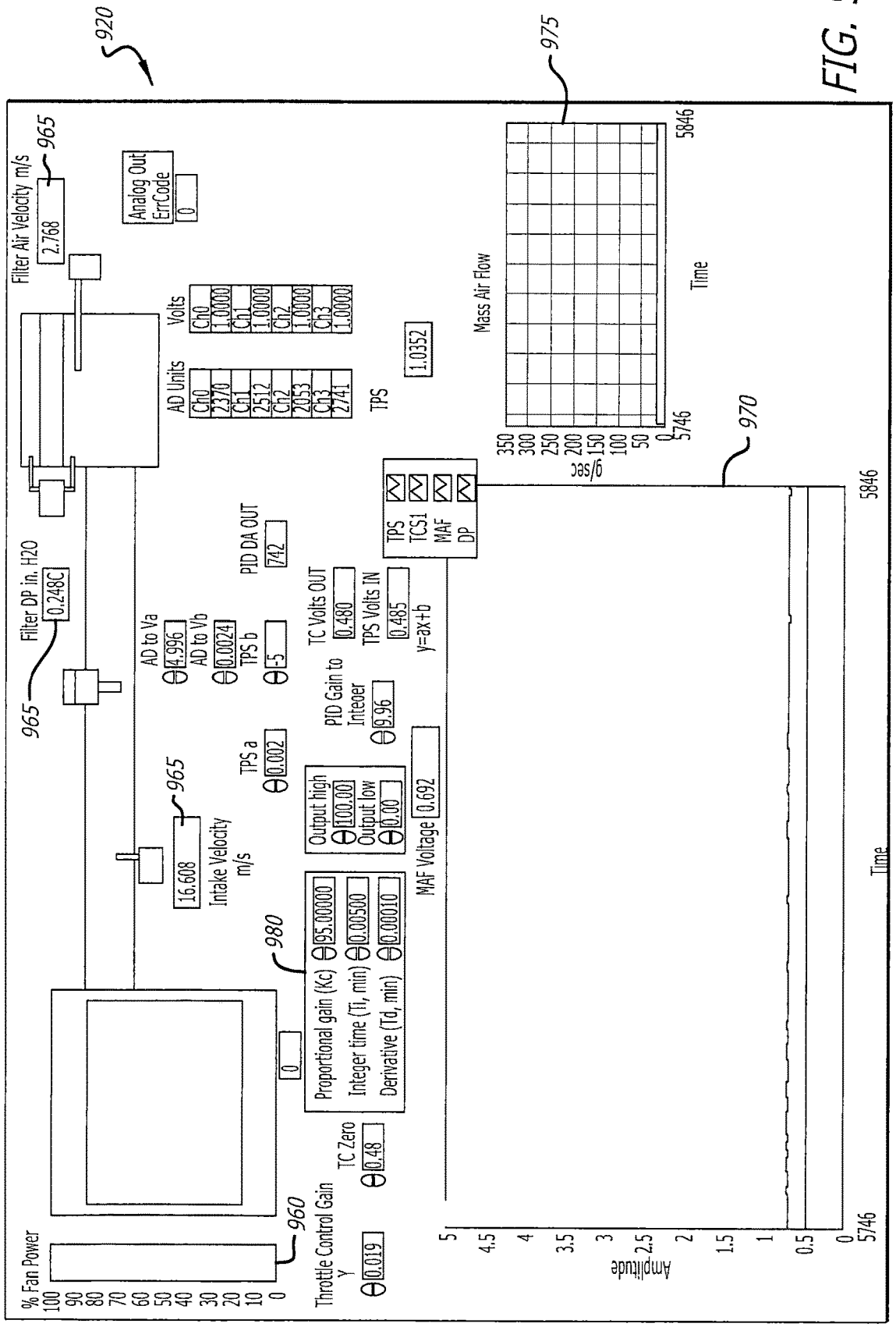
FIG. 9C illustrates an exemplary embodiment of a GUI configured to facilitate a practitioner adjusting control parameters for the throttle and calibration coefficients for various data inputs related to operation of a portable MAF training module.

FIGS. 9A-9B illustrate an exemplary embodiment of a GUI 900 configured to display information related to the airflow 102 being drawn through the portable MAF training module 100. In general, the GUI 900 enables a practitioner to select a desired throttle position setting and observe a resultant mass airflow through the portable MAF training module 100 that is measured by the MAF sensor 125. In the illustrated embodiment, the GUI 900 comprises a throttle control bar 905 that is configured as a slider 910 that may be adjusted by a practitioner with respect to a numerical indicator 915. It is contemplated that the practitioner may adjust the slider 910 by dragging the slider with a pointing device, such as, by way of example, a mouse, a stylus, or pointing to a touchscreen, and the like. In some embodiments, the numerical indicator 915 represents percentages of a fully opened configuration of the throttle valve 530. Thus, the throttle valve 530 may be controllably opened by way of a practitioner moving the slider 910 along the numerical indicator 915. For example, in the illustrated embodiment of FIG. 9B, the slider 910 may be positioned adjacent to a value of about 70 along the numerical indicator 915 to move the throttle valve 530 to about 70% of the fully opened configuration. As will be appreciated, the throttle valve 530 may be placed into the fully opened configuration by the practitioner moving the slider 910 adjacent to a value of about 100 along the numerical indicator 915. Alternatively, the practitioner may fully close the throttle valve 530 by moving the slider 910 adjacent to a value of substantially zero along the numerical indicator 915, as is shown in FIG. 9A. It is contemplated, however, that control of the throttle valve 530 by way of the GUI 900 is not to be limited to the throttle control bar 905, but rather any of various controls may be presented to the practitioner by way of the GUI 900, without limitation, whereby the practitioner may controllably move the throttle valve 530.

As will be appreciated, opening the throttle valve 530 allows relatively more airflow through the portable MAF training module 100 that may be detected by the MAF sensor 125. As such, the GUI 900 includes a numerical MAF display 930 that is configured to show a numerical output of the mass airflow, expressed in terms of grams per second (g/s), that is measured by the MAF sensor 125. Further, a MAF dial 940 comprising the GUI 900 is configured to point to the numerical output of the MAF sensor 125 along a range of possible mass airflow values. Like the MAF display 930, the MAF dial 940 expresses mass airflow values in terms of grams per second. In some embodiments, however, the MAF display 930 and/or the MAF dial 940 may express the mass airflow values in terms of units other than grams per second, such as by way of example, pounds per hour (lbs/hr), without limitation. The GUI 900 further includes a differential pressure chart 950 that is configured to display the output of the differential pressure sensor 150, discussed herein. In the illustrated embodiment, the differential pressure chart 950 displays the differential pressure in terms of "inches of H2O" as a function of time. Thus, the differential pressure chart 950 displays the difference in ambient pressure and the pressure inside the filter box 140 as a function of elapsed time in seconds. As will be appreciated, the differential pressure chart 950 may be configured to display the differential pressure in terms of units other than "inches or H2O," such as, for example, "centimeters of H2O."

It is contemplated that the GUI 900 will assist the practitioner in understanding a correlation among throttle control, mass airflow, and differential pressure. For example, FIG. 9A shows a condition wherein the throttle control bar 905 is set to about zero and the throttle valve 530 is substantially closed. The MAF sensor 125 is shown to be detecting a nominal airflow of about 17 g/s, and the pressure differential chart 950 indicates a relatively low difference in pressure between outside and inside the filter box 140 (e.g., approximately less than 0.5 inches of H2O/second). FIG. 9B, however, shows a condition wherein the throttle control bar 905 is set to about 70 and the throttle valve 530 is open substantially 70%. The numerical MAF display 930 and the MAF dial 940 show a mass airflow of about 268 g/s is measured by the MAF sensor 125. Further, the pressure differential chart 950 indicates that a relatively increased pressure difference of nearly 3.0 inches of H2O/second exists between the outside and inside of the filter box 140. Thus, the GUI 900 demonstrates the relationship between position of the throttle valve 530, the mass airflow moving through the throttle assembly 115, and the differential pressure occurring across the air filter 135.

FIG. 9C illustrates an exemplary embodiment of a GUI 920 configured to facilitate the practitioner adjusting control parameters for the throttle and calibration coefficients for various data inputs related to operation of a portable MAF training module 100. The GUI 920 is comprised of a fan control bar 960 that indicates a percentage of electric power being passed to the in-line blower 105. As the percentage of electric power is increased, the in-line blower 105 intakes a greater airflow 102, thereby facilitating simulating various engine sizes, such as, by way of example, 4-cylinder engines, 6-cylinder engines, 8-cylinder engines, and the like. Further, a multiplicity of numerical display boxes 965 may be incorporated into the GUI 920 so as to indicate, for example, an intake air velocity, the differential pressure across the air filter 135, the air velocity across the air filter 135, as well as any other operational parameters that may be deemed useful for controlling the operation of the portable MAF training module 100. The various values that are displayed in the numerical display boxes 965, as well as any other values that may be useful, may be further displayed in a graph or chart format, such as a voltage amplitude chart 970 and a mass airflow chart 975. Further, the GUI 920 may include one or more display boxes 980 configured to show various other real-time parameters that may be relevant to the operation of the portable MAF training module 100, such as, by way of non-limiting example, proportional gain, integral time, and derivative time. It should be understood, however, that the GUI 920 is not to be limited to the specific elements illustrated in the figures or discussed herein. Rather, it is contemplated that the GUI 920 may be comprised of any of various elements that may be found to be useful for the purpose of operating the portable MAF training module 100, without limitation, and without deviating beyond the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A MAF control appliance for simulating an engine control module of a motor vehicle, comprising:
    a throttle control for positioning a throttle control valve comprising a throttle assembly;
    a sensor logic for interpreting data received from a MAF sensor;
    one or more hardware processors for processing signals received from the throttle control and the sensor logic;
    a user interface logic for displaying received signals on an electronic device by way of a communication link; and
    a memory.

2. The MAF control appliance of claim 1, wherein the sensor logic comprises one or more modules and logic for receiving electronic signals from the MAF sensor.

3. The MAF control appliance of claim 2, wherein the sensor logic is configured for interpreting the electronic signals in terms of physical quantities.

4. The MAF control appliance of claim 3, wherein the physical quantities comprise any one or more of mass airflow, throttle position, air velocity, differential air pressure, and filter air velocity.

5. The MAF control appliance of claim 1, wherein the throttle control includes any one more of a frequency generator, a duty cycle modulator, a throttle controller, a position feedback, and a PID controller.

6. The MAF control appliance of claim 5, wherein the PID controller is configured for generating an input signal to the duty cycle modulator based on a difference between an actual throttle position and a desired throttle position.

7. The MAF control appliance of claim 6, wherein the throttle control is configured for supplying electric power to a motor for moving a throttle control valve to the desired throttle position.

8. A throttle control for positioning a throttle control valve comprising a throttle assembly, comprising: a frequency generator; a duty cycle modulator; a throttle controller; a position feedback; and a PID controller.

9. The throttle control of claim 8, wherein the PID controller indicates a difference between an actual throttle position and a desired throttle position to the duty cycle modulator.

10. The throttle control of claim 9, wherein the throttle control causes a motor to move the throttle control valve to the desired throttle position.

11. The throttle control of claim 10, wherein the throttle control includes a drive circuit that generates a PWM drive signal to operate the motor.

12. The throttle control of claim 11, wherein the drive circuit comprises a transistor and a relay.

13. The throttle control of claim 12, wherein the duty cycle modulator includes one or more processors for regulating an electric current directed to the motor.

14. The throttle control of claim 8, wherein the throttle assembly comprises: a throttle valve; a plenum chamber; a throttle housing; and a throttle position sensor.

15. The throttle control of claim 14, wherein the throttle position sensor configured to monitor the actual position of the throttle valve.

16. The throttle control of claim 15, wherein the throttle position sensor is coupled with a butterfly spindle/shaft comprising the throttle valve.

17. The throttle control of claim 16, wherein a closed-throttle position sensor is included to indicate that the throttle valve is completely closed.

18. An apparatus for simulating an air intake of an internal combustion engine, comprising:
    a filter-housing for receiving an airflow;
    an in-line blower for drawing the airflow through an air filter;
    a throttle valve for regulating the airflow;
    a differential pressure sensor coupled with the filter-housing; and
    an air velocity sensor coupled with the filter-housing.

19. The apparatus of claim 18, wherein the differential pressure sensor is configured to measure a difference between ambient air pressure and an air pressure within the filter-housing.

20. The apparatus of claim 18, wherein the air velocity sensor is configured to measure a speed of the airflow through the air filter.

* * * * *